United States Patent

Tanikawa et al.

[11] Patent Number: 5,351,936
[45] Date of Patent: Oct. 4, 1994

[54] FLUID CONTROLLER

[75] Inventors: Tsuyoshi Tanikawa; Tetsuya Kojima, both of Osaka, Japan

[73] Assignee: Fujikin Incorporated, Osaka, Japan

[21] Appl. No.: 839,557

[22] Filed: Feb. 24, 1992

[30] Foreign Application Priority Data

Feb. 26, 1991 [JP] Japan .................. 3-030922

[51] Int. Cl.⁵ .................. F16K 31/50; F16K 41/10
[52] U.S. Cl. .................. 251/278; 251/122; 251/335.3
[58] Field of Search .................. 251/335.3, 77, 80, 264, 251/276, 278, 335.2, 121, 122

[56] References Cited

U.S. PATENT DOCUMENTS

| | | | |
|---|---|---|---|
| 3,278,156 | 10/1966 | Callahan et al. | 251/335.3 |
| 3,391,901 | 7/1968 | Wheeler et al. | 251/331 |
| 3,990,680 | 11/1976 | Massey, Jr. | 251/335.3 |
| 4,201,366 | 5/1980 | Danko et al. | 251/335.3 |
| 4,509,721 | 4/1985 | Lassally | 251/335.3 |
| 4,526,341 | 7/1985 | Thomas | 251/335.3 |
| 4,804,164 | 2/1989 | Nakazawa et al. | 251/335.3 |
| 4,911,412 | 3/1990 | Danko | 251/335.3 |
| 4,941,504 | 7/1990 | Beauvir | 251/335.3 |

FOREIGN PATENT DOCUMENTS 571561  3/1959  Belgium .
2420070  10/1979  France .

Primary Examiner—George L. Walton

[57] ABSTRACT

A fluid controller comprising a valve element and a valve stem rotatably attached at its lower end to the upper end of the valve element, the valve element being movable upward or downward by rotating the valve stem to move the valve stem upward or downward. The valve element is brought into contact with and seated in a valve seat to close a fluid channel by being moved downward. The element is brought out of contact with the valve seat to open the fluid channel by being moved upward. The controller has an elastic member for biasing the valve element upward to press the element against the valve stem with a predetermined force in the vicinity of the seated position where the valve element is in contact with the valve seat.

4 Claims, 2 Drawing Sheets

5,351,936

FLUID CONTROLLER

BACKGROUND OF THE INVENTION

The present invention relates to a fluid controller comprising a valve element which is movable upward or downward by rotating a valve stem to open or close a fluid channel.

With fluid controllers of the type mentioned, the valve element is movable upward or downward by rotating the valve stem to move the stem upward or downward. The valve element is brought into contact with and seated in a valve seat to close a fluid channel by being moved downward. The valve element is brought out of contact with the valve seat to open the fluid channel by being moved upward. The valve stem and the valve element are provided as separate members, and the lower end of the stem is rotatably attached to the upper end of the element so that the valve element will not rotate with the stem when coming into contact with the valve seat.

However, when the valve stem is rotatably attached to the valve element, an upward or downward backlash (play) inevitably occurs therebetween, consequently entailing the following problem.

Fluid controllers include those wherein the valve element bites into the valve seat with a wedge effect when seated in the seat to completely close the fluid channel. The smaller the cone angle of the valve element, the greater is the wedge effect and the greater is the likelihood of the valve element biting into the seat. When the biting of the valve element occurs, the valve element remains biting in the valve seat without moving upward even if the valve stem is rotated from the completely closing position toward an opening direction, until the stem moves upward by an amount corresponding to the backlash between the stem and the element. It is when the valve stem has moved by a greater amount that the element comes out of contact with the seat. The moment the valve element leaves the seat, the element is pushed toward the valve stem by the pressure of fluid and thereby moved upward by an amount corresponding to the backlash to strike against the stem. The same phenomenon as above occurs also in the case of valves having bellows or diaphragm incorporated therein. Accordingly, the striking contact of the valve element with the valve stem gives off a noise, causing the user discomfort. Further especially when the fluid controller is used for controlling the rate of flow, extreme difficulty is encountered in finely adjusting the flow rate between the fully closed position and a slightly opened position.

SUMMARY OF THE INVENTION

The main object of the present invention is to provide a fluid controller which produces no striking noise when the fluid channel is slightly opened from the fully closed position and which is adapted for the fine adjustment of flow rate.

The present invention provides a fluid controller having a valve element and a valve stem rotatably attached at its lower end to the upper end of the valve element, the valve element being movable upward or downward by rotating the valve stem to move the valve stem upward or downward, the valve element being movable downward to a seated position to contact a valve seat and close a fluid channel, the valve element being movable upward out of contact with the valve seat to open the fluid channel, the fluid controller being characterized in that the controller has an elastic member for urging the valve element upward to press the valve element against the valve stem with a predetermined force in the vicinity of the seated position where the valve element is in contact with the valve seat.

The terms "upward" and "downward" and like terms as used herein and in the appended claims are merely intended to express the position relation between the components of the fluid controller as arranged in the drawings showing the embodiment to be described below. These terms should not be interpreted as expressing the absolute "up-down" relation in the state in which the controller is used.

The fluid controller of the present invention gives off no striking noise when the fluid channel is slightly opened from the fully closed position and is usable for the fine adjustment of flow rate as will be described below.

In the vicinity of the seated position, the valve element is urged upward and pressed against the valve seat by the elastic member, so that even if the valve element is caused to bite into the seat when seated in the seat to fully close the channel, the valve element immediately moves upward out of contact with the seat while being pressed against the stem by the elastic member, when the valve element is slightly rotated in the opening direction and thereby slightly moved upward. Unlike the prior art, therefore, this eliminates the likelihood that the valve element will move at a time by an amount corresponding to the backlash to strike against the valve stem. Thus, the valve element produces no striking noise. Further the flow through the channel is finely adjustable because in the vicinity of the seated position, the valve element is movable following the movement, if slight, of the valve stem.

As a feature of the invention, the elastic member is disposed between the upper surface of a guide portion for guiding the valve element and a flangelike portion fixedly provided on a portion of the valve element above the guide portion. As another feature of the invention, the elastic member is disposed on the upper surface of the guide portion, the flangelike portion is upwardly away from the elastic member when the valve element is positioned to fully open the fluid channel, and the flange portion contacts the elastic member when the valve element is in the vicinity of the seated position. As another feature, the elastic member comprises a disc spring.

DESCRIPTION OF THE PREFERRED EMBODIMENT

An embodiment of the present invention will be described below with reference to the accompanying drawings.

Figure 1:
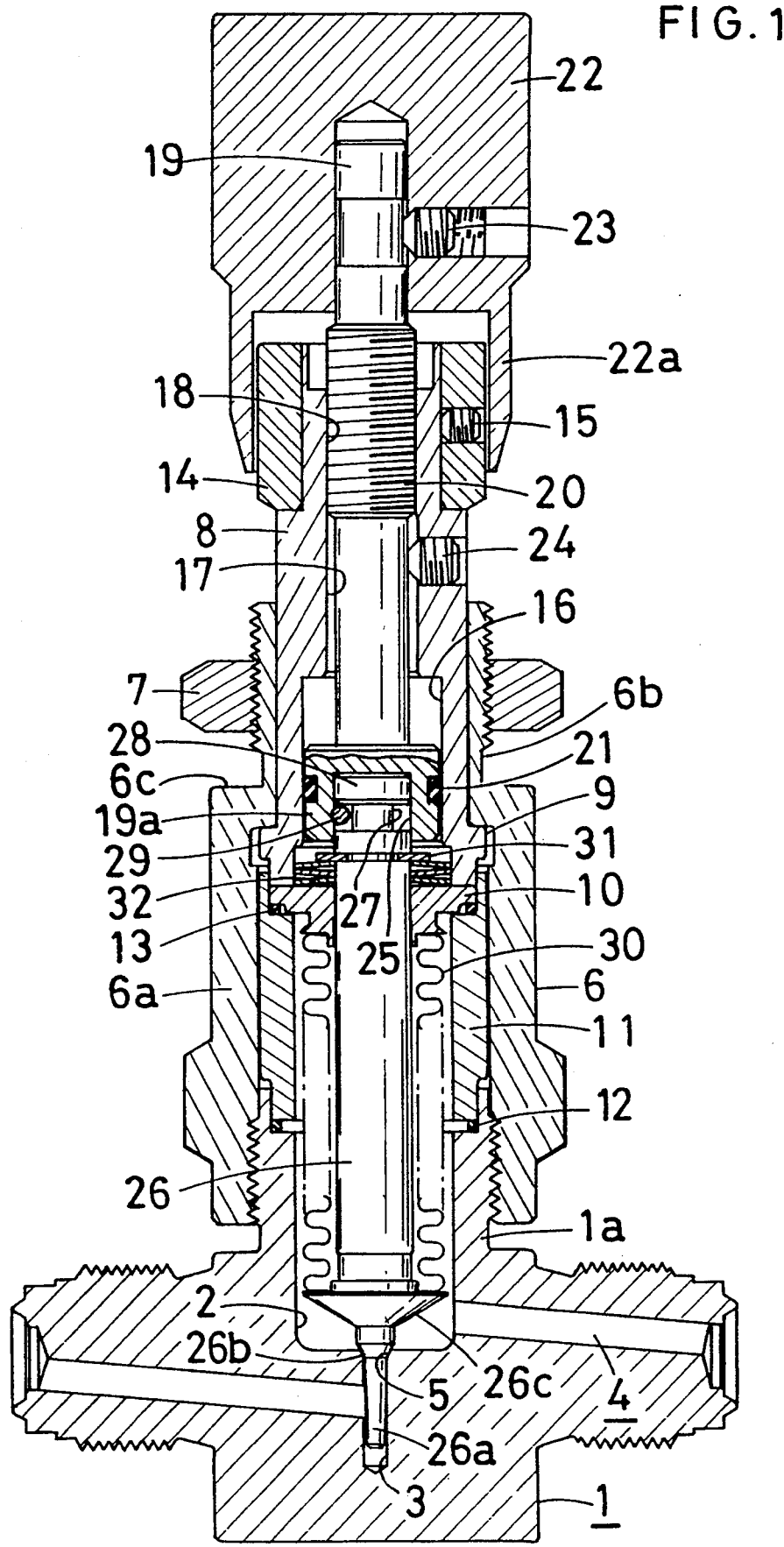
FIG. 1 is a view in vertical section showing a fluid controller embodying the invention.
Figure 2:
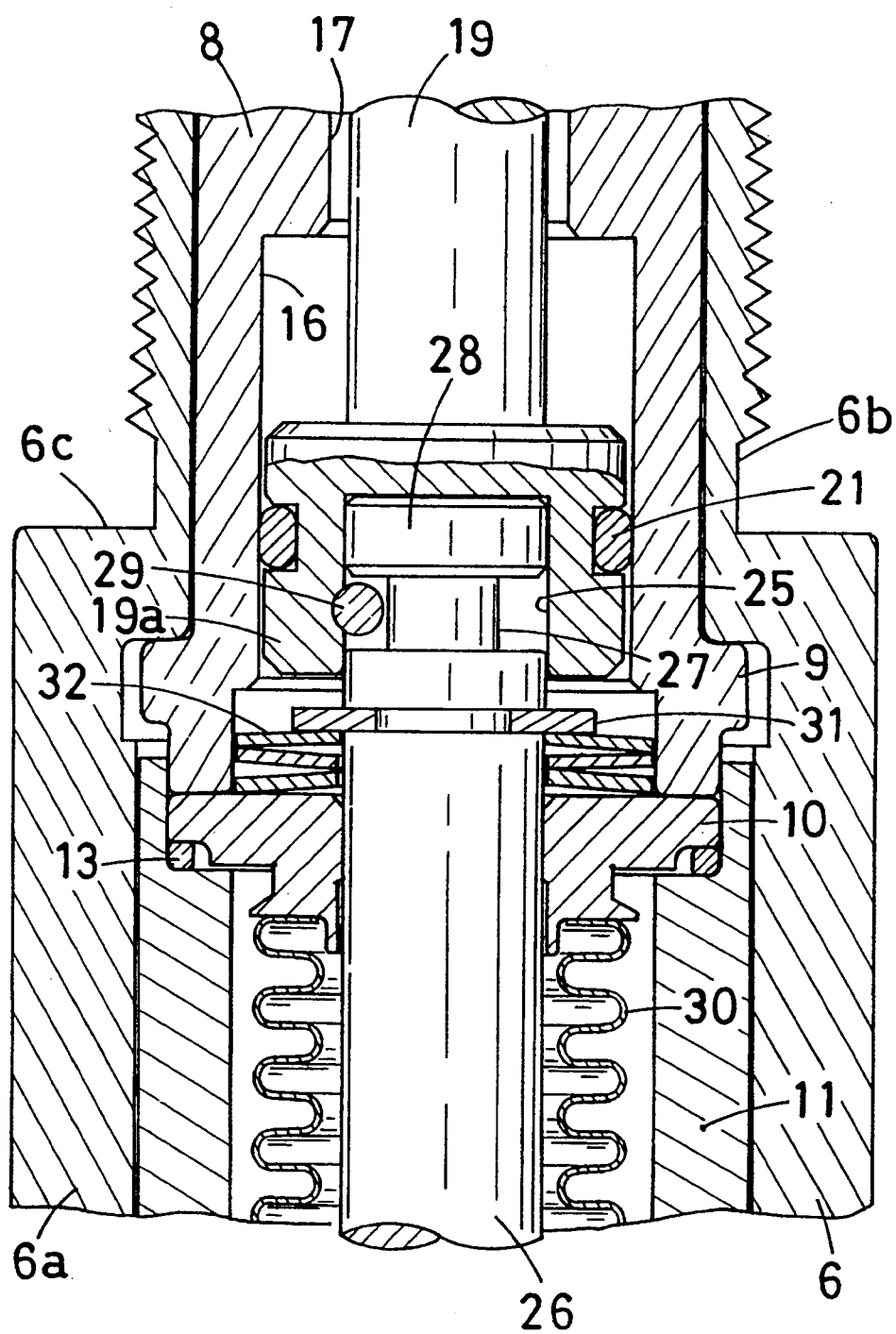
FIG. 2 is an enlarged fragmentary view in vertical section of FIG. 1.

FIG. 1 shows the overall construction of a fluid controller adapted for flow rate adjustment, and FIG. 2 shows the main portion of the same in greater detail.

The fluid controller includes a valve case 1 which has an upwardly projecting cylindrical portion 1a, a valve stem bore 2 having a large diameter and extending from the upper end of the cylindrical portion 1a to an intermediate portion of the height of the valve case 1, and a guide bore 3 having a small diameter and extending from the bottom of the bore 2 to a lower portion of the valve case 1. A fluid channel 4 is formed by a passage extending from one side face of the case 1 to an intermediate portion of the guide bore 3, the bottom portion of the stem bore 2, and a passage extending from this portion to the other side face of the valve case 1. A downwardly tapered annular valve seat 5 is provided at the upper end of the guide bore 3.

A valve closure 6 in the form of a stepped cylinder has a lower portion which is screwed around the cylindrical portion 1a of the valve case 1. More than the lower-half part of the valve closure 6 is a large-diameter portion 6a which is large in inside and outside diameters, and the remaining upper part thereof is a small-diameter portion 6b which is small in inside and outside diameters. An annular shoulder 6c is provided between these portions 6a, 6b. The lower end part of the large-diameter portion 6a of the closure 6 is screwed on the cylindrical portion 1a of the case 1. The small-diameter portion 6b of the closure 6 is insertable through a mount hole in a panel (not shown). The panel is to be held between the shoulder 6c and a nut 7 screwed on the small-diameter portion 6b.

A valve stem support member 8, which is in the form of a stepped bored cylinder, is formed with an outer flange 9 at a lower portion thereof. Fitted inside the large-diameter portion 6a of the valve closure 6 are the portion of the support member 8 not higher than the flange 9, a valve element guide member 10 in the form of a bore short cylinder and serving also as a spring retainer, and a hollow cylindrical spacer 11. These are held between the shoulder 6c of the closure 6 and the upper end of the cylindrical portion 1a of the valve case 1. The lower end of the spacer 6 is smaller in outside diameter than the other portion thereof and is fitted in the upper end of the stem bore 2 of the case 1 which is slightly larger in inside diameter than the other bored portion. A gasket 12 seals off the joint between the spacer 31 and the case cylindrical portion 1a. The spacer 11 has an upper end portion which is greater than the other portion thereof in inside diameter and which has fitted therein the diametrically greater upper portion of the guide member 10 and the lower end of the stem support member 8. The joint between the spacer 11 and the guide member 10 is sealed off by a gasket 13.

The portion of the support member 8 above its flange 9 fits in the small-diameter portion 6b of the closure 6 and further extends upward beyond the upper end of the portion 6b. The support member 8 has an upper end portion having a slightly reduced outside diameter. An indicator 14 in the form of a hollow cylinder is fitted around this portion and fixed thereto with a setscrew 15.

The stem support member 8 has a large-diameter bore 16 formed in its lower portion and a small-diameter bore 17 extending upward therefrom. The upper and lower bores extend through the member 8. The bored portion indicated at 17 has a female screw 18 at an upper part thereof. A valve stem 19 is inserted through these bores 16, 17. The valve stem 19 has an externally threaded upper portion 20, which is screwed in the female screw 18 of the support member 8. The valve stem 19 is formed at its lower end with a large-diameter portion 19a which has a larger outside diameter than the other portion thereof and which is fitted in the large-diameter bore 16 of the support member 8. An O-ring 21 is attached to the outer periphery of the large-diameter portion 19a for sealing off the clearance between the portion 19a and the support member 8. The portion of the valve stem 19 above the male screw 20 extends upward beyond the upper ends of the support member 8 and the indicator 14 and has a solid cylindrical knob 22 fitted around the stem and fixed thereto with a setscrew 23. The knob 22 has at its lower end a hollow cylindrical portion 22a, which is fitted around the indicator 14.

The peripheral wall of the support member 8 defining the small-diameter bore 17 has a lock screw 24 attached thereto. The valve stem 18 is rotated and thereby moved upward or downward by rotating the knob 22 with the lock screw 24 loosened, and is fixed in a desired position by tightening up the lock screw 24. The indicator 14 indicates the amount of upward or downward movement of the valve stem 19.

The large-diameter portion 19a of the valve stem 19 is formed with an insertion cavity 25 extending upward from its bottom face. A valve element 26 has an upper portion inserted in the cavity 25. The valve member 26 is generally in the form of a vertically elongated solid cylinder and extends downward through the guide member 10. The portion of the valve element 26 inserted in the cavity 25 has an annular groove 27 toward its upper end, and a flange 28 at its upper end. The valve stem large-diameter portion 19a is fixedly provided with a pin 29 in parallel to a diametrical direction thereof. The pin has an intermediate portion partly fitted in the groove 27 of the upper portion of the valve element 26. Accordingly, the valve stem 19 and the valve element 26, although rotatable relative to each other, are almost immovable upward or downward (axially thereof) relative to each other. It is desirable to minimize the backlash between the flange 28 of the valve element 26 and the top wall defining the cavity 25 and positioned thereabove, as well as between the flange and the pin 29 therebelow, whereas some backlash inevitably occurs therebetween.

The valve element 26 is formed at its lower end with a tapered guide rod 26a of small diameter and a downwardly tapered conical face 26b positioned above the rod. When the valve element 26 moves downward, the tapered rod 26b fits into the guide bore 3, and the conical face 26b is brought into contact with and seated in the valve seat 5 to close the channel 4. When the valve element 26 moves upward, the conical face 26b is moved upward out of contact with the valve seat 5 to open the channel 4. Bellows 30 are provided between the lower portion of the guide member 10 and an inverted conical portion 26c formed on the valve element 26 slightly above the conical face 26b to seal off the element between these portions. The upper and lower ends of the bellows 30 are secured to these portions in intimate contact therewith.

A spring retainer 31 in the form of a retaining ring is fixed to the outer periphery of the valve element 26 immediately below the valve stem 19. A disc spring 32 serving as an elastic member is provided on the guide member 10. The disc spring 32 is in pressing contact with the spring retainer 31 when the valve element 26 is in the vicinity of its seated position, urging the valve element 26 upward and pressing the upper end face thereof into contact with the top wall of the valve stem 19 defining the cavity 25.

When the knob is rotated in an opening direction, the valve stem 19 and the valve element 26 move upward, bringing the conical face 26b of the element 26 out of contact with the seat 5 to open the channel 4. When the channel 4 is fully opened, the large-diameter portion 19a of the stem 19 is moved to the top of the large-diameter bore 16 of the support member 8 to position the spring retainer 31 of the valve element 26 upwardly away from the disc spring 32. Accordingly, the valve element 26 will not be urged upward by the disc spring 32 but is upwardly urged by the bellows 30 and pressed against the valve stem 19 with a relatively small force.

When the knob 22 is rotated toward a closing direction, the valve stem 19 and the valve element 26 move down. Upon the valve stem 19 reaching such a position that the conical face 26b of the valve element 26 is located a short distance above the seated position where the face contacts the valve seat 5, the spring retainer 31 on the valve element 26 comes into contact with the disc spring 32, which in turn urges the valve element 26 upward into pressing contact with the valve stem 19 with a greater force than previously. When the conical face 26b of the valve element 26 is brought into contact with and seated in the valve seat 5, fully closing the channel 4, the valve element 26 is pressed against the valve stem 19 with a further increased force due to the reaction from the seat 5.

When the knob 22 is slightly rotated from the full-closing state, slightly moving the valve stem 19 upward, the valve element, which is upwardly urged and pressed against the valve stem 19 by the disc spring 32, immediately moves upward out of contact with the seat 5 while being pressed against the stem 19 by the disc spring 32, even if the conical face 26b of the valve element 26 in the fully closing position is in biting engagement with the seat 5. Unlike the conventional device, therefore, the valve element 26 will not move at a time by an amount corresponding to the backlash into striking contact with the valve stem 19, hence no striking noise. Furthermore, the flow through the channel 4 is finely adjustable because in the vicinity of the seated position, the valve element 26 is movable following the movement, if slight, of the valve stem 19.

What is claimed is:

1. A fluid controller comprising:

a valve element being formed at a lower end portion thereof with a downwardly tapered conical face to be seated;

a valve stem being attached at a lower end portion thereof to the upper end portion of the valve element so that the valve element and the valve stem are rotatable axially thereof relative to each other, the valve stem being movable in one of an upward direction and a downward direction by rotation thereof, and thereby the valve element being movable axially in one of an upward direction and a downward direction, the tapered conical face contacting an annular valve seat to close a fluid channel by moving the valve element in a downward direction, the tapered conical face being away from the valve seat to open the fluid channel by moving the valve element in an upward direction; and elastic member means for urging the valve element upward to press the valve element against the valve stem with a predetermined force when the valve element is in a first range of movement, the first range of movement including a predetermined range of movement wherein the valve element is in ine of a seated position and positions in the vicinity of the seated position, and wherein the elastic member means does not urge the valve element when the valve element is moved through a second range of movement.

2. A fluid controller as defined in claim 1, wherein the elastic member means is disposed between an upper surface of a guide portion for guiding the valve element and a flange-like portion fixedly provided on a portion of the valve element above the guide portion, both the guide portion and the flange-like portion contacting the elastic member means only when the valve element is in the first range of movement.

3. A fluid controller as defined in claim 2, wherein the elastic member means is disposed on the upper surface of the guide portion, the flange-like portion contacting the elastic member means when the valve element is in the first range of the movement, the flange-like portion being upwardly away from the elastic member means when the valve element is in the second range of movement.

4. A fluid controller as defined in claim 3, wherein the elastic member means comprises a disc spring.

* * * * *